US012610367B2

(12) United States Patent
Deghel et al.

(10) Patent No.: US 12,610,367 B2
(45) Date of Patent: Apr. 21, 2026

(54) TRANSMISSION OF UCI VIA RE-CONFIGURABLE PUCCH

(71) Applicant: NOKIA TECHNOLOGIES OY, Espoo (FI)

(72) Inventors: Matha Deghel, Paris (FR); Keeth Saliya Jayasinghe Laddu, Espoo (FI); Sami Hakola, Kempele (FI); Klaus Hugl, Vienna (AT)

(73) Assignee: Nokia Technologies Oy, Espoo (FI)

( * ) Notice: Subject to any disclaimer, the term of this patent is extended or adjusted under 35 U.S.C. 154(b) by 508 days.

(21) Appl. No.: 17/904,942

(22) PCT Filed: Feb. 24, 2020

(86) PCT No.: PCT/EP2020/054760

§ 371 (c)(1),
(2) Date: Aug. 24, 2022

(87) PCT Pub. No.: WO2021/170205

PCT Pub. Date: Sep. 2, 2021

(65) Prior Publication Data

US 2023/0124792 A1 Apr. 20, 2023

(51) Int. Cl.
*H04W 72/21* (2023.01)
*H04L 5/00* (2006.01)
*H04W 72/02* (2009.01)
*H04W 80/02* (2009.01)

(52) U.S. Cl.
CPC ........... *H04W 72/21* (2023.01); *H04L 5/0051* (2013.01); *H04W 72/02* (2013.01); *H04W 80/02* (2013.01)

(58) Field of Classification Search
CPC ..... H04W 72/21; H04W 72/02; H04W 80/02; H04L 5/0051; H04L 5/0091; H04L 5/0053
See application file for complete search history.

(56) References Cited

U.S. PATENT DOCUMENTS

| | | | | |
|---|---|---|---|---|
| 12,028,898 B2* | 7/2024 | Wang | ................ | H04W 74/0866 |
| 12,167,405 B2* | 12/2024 | Nayeb Nazar | .......... | H04L 1/007 |
| 2013/0259011 A1* | 10/2013 | Nakashima | ........... | H04W 52/48 |
| | | | | 370/336 |
| 2015/0092624 A1* | 4/2015 | Yao | ........................ | H04L 1/1671 |
| | | | | 370/278 |

(Continued)

FOREIGN PATENT DOCUMENTS

WO 2020123146 A1 6/2020

OTHER PUBLICATIONS

International Search Report and Written Opinion for International Application No. PCT/EP2020/054760, mailed on Nov. 24, 2020, 19 pages.

(Continued)

*Primary Examiner* — Wutchung Chu

(74) *Attorney, Agent, or Firm* — Brake Hughes Bellermann LLP

(57) ABSTRACT

There is provided a method to operate a first apparatus (100) of a cellular radio communications network, wherein the method comprises: receiving a plurality of PUCCH, Physical Uplink Control Channel, configuration parameters; and transmitting UCI, Uplink Control Information, via a PUCCH, wherein the PUCCH is configured according to at least one of the received plurality of PUCCH configuration parameters.

8 Claims, 4 Drawing Sheets

(56) References Cited

U.S. PATENT DOCUMENTS

| | | | | |
|---|---|---|---|---|
| 2018/0220415 A1* | 8/2018 | Yin | H04L 5/0094 |
| 2018/0294938 A1* | 10/2018 | Munier | H04L 5/0073 |
| 2018/0324786 A1* | 11/2018 | Hooli | H04W 72/02 |
| 2019/0239216 A1* | 8/2019 | Kundu | H04L 1/1819 |
| 2019/0239286 A1* | 8/2019 | Chang | H04W 88/10 |
| 2019/0349973 A1* | 11/2019 | Yang | H04L 5/0055 |
| 2019/0380125 A1* | 12/2019 | Yamamoto | H04W 72/21 |
| 2019/0393992 A1* | 12/2019 | Xiong | H04L 1/1812 |
| 2020/0077423 A1* | 3/2020 | Park | H04W 72/1263 |
| 2020/0119799 A1* | 4/2020 | Jung | H04B 7/06964 |
| 2020/0196346 A1* | 6/2020 | Khoshnevisan | H04L 1/08 |
| 2020/0205182 A1* | 6/2020 | Yamamoto | H04W 72/04 |
| 2020/0221444 A1* | 7/2020 | Tiirola | H04L 1/1812 |
| 2020/0221445 A1* | 7/2020 | Tsai | H04W 72/0453 |
| 2020/0314860 A1* | 10/2020 | Zhou | H04W 72/23 |
| 2020/0374869 A1* | 11/2020 | Li | H04L 1/00 |
| 2021/0014647 A1* | 1/2021 | Takeda | H04W 72/21 |
| 2021/0022124 A1* | 1/2021 | Miao | H04W 72/23 |
| 2021/0050980 A1* | 2/2021 | Baldemair | H04L 5/0053 |
| 2021/0051650 A1* | 2/2021 | Yi | H04W 72/21 |
| 2021/0153188 A1* | 5/2021 | Wang | H04L 5/0051 |
| 2021/0204097 A1* | 7/2021 | Takeda | H04W 72/21 |
| 2021/0250944 A1* | 8/2021 | Ji | H04L 1/1854 |
| 2021/0274494 A1* | 9/2021 | Feng | H04L 1/1896 |
| 2021/0329676 A1* | 10/2021 | Yang | H04W 4/46 |
| 2021/0368496 A1* | 11/2021 | Li | H04W 72/0446 |
| 2022/0030443 A1* | 1/2022 | Chen | H04W 72/21 |
| 2022/0078813 A1* | 3/2022 | Miao | H04W 36/0088 |
| 2022/0086824 A1* | 3/2022 | Kundu | H04B 1/713 |
| 2022/0150918 A1* | 5/2022 | Xu | H04W 72/569 |
| 2022/0217678 A1* | 7/2022 | Yoshioka | H04W 72/02 |
| 2022/0247543 A1* | 8/2022 | Fu | H04L 27/0006 |
| 2022/0279507 A1* | 9/2022 | Takahashi | H04W 72/21 |
| 2022/0361238 A1* | 11/2022 | Yamamoto | H04W 72/0453 |
| 2022/0377731 A1* | 11/2022 | Yang | H04W 72/21 |
| 2022/0377796 A1* | 11/2022 | Jung | H04L 1/1812 |
| 2022/0386300 A1* | 12/2022 | Gao | H04W 72/23 |
| 2023/0048080 A1* | 2/2023 | Takahashi | H04L 1/1864 |
| 2023/0299906 A1* | 9/2023 | Yuan | H04L 1/1861 370/329 |
| 2024/0072975 A1* | 2/2024 | Rastegardoost | H04W 72/20 |
| 2024/0237004 A1* | 7/2024 | Koorapaty | H04L 5/0055 |

OTHER PUBLICATIONS

3GPP TSG RAN WG1 #96bis, R1-1904562; "Consideration on Multi-Beam Operation Enhancement"; Xi'an, China; Apr. 8-12, 2019; 8 pages.

3GPP TSG-RAN WG1 Meeting #97, Tdoc R1-1907436; "Enhancements to Multi-Beam Operation"; Reno, Nevada, USA; May 13-17, 2019; 18 pages.

3GPP TSG RAN WG1 Meeting RAN1#97, R1-1907697; "On Multi-TRP and Multi-Panel"; Reno, Nevada, USA; May 13-17, 2019; 24 pages.

3GPP TSG-RAN WG1 Meeting #98, Tdoc R1-1909225; "Enhancements to Multibeam Operation"; Prague, Czech Republic; Aug. 26-30, 2019; 24 pages.

3GPP TSG-RAN WG1 Meeting #97, Tdoc R1-1097475; "Signalling Reduction for Beam-Based UL Power Control"; Reno, Nevada, USA; May 13-17, 2019; 4 pages.

3GPP TSG RAN WG1 Meeting #96bis, R1-1903974; "UL/DL BM for Latency/Overhead Reduction"; Xi'an, China; Apr. 8-12, 2019; 8 pages.

3GPP TSG RAN WG1 Meeting #96bis, R1-1904967; "Discussion on Multi-Beam Enhancement"; Xi'an, China; Apr. 8-12, 2019; 26 pages.

* cited by examiner

TRANSMISSION OF UCI VIA RE-CONFIGURABLE PUCCH

CROSS-REFERENCE TO RELATED APPLICATIONS

This application is a national stage entry of International Application No. PCT/EP2020/054760, filed Feb. 24, 2020, entitled "TRANSMISSION OF UCI VIA RE-CONFIGURABLE PUCCH" which is hereby incorporated by reference in its entirety.

FIELD OF THE INVENTION

Various example embodiments relate to enhancements for a Physical Uplink Control Channel.

BACKGROUND

The Radio Resource Control, RRC, control plane functionality operates between the RRC located in the gNB. RRC is responsible for handling the RAN-related control-plane procedures.

SUMMARY

According to a first aspect of the description a first apparatus is provided, the first apparatus comprising at least one processor, at least one memory including computer program code, and at least one communication module, the at least one memory and computer program code configured, with the at least one processor, and the at least one communication module, to cause the first apparatus at least to: receive a plurality of PUCCH, Physical Uplink Control Channel, configuration parameters; and transmit uplink control information via a PUCCH, wherein the PUCCH is configured according to at least one of the received plurality of PUCCH configuration parameters.

RRC reconfiguration is a heavy and slow procedure. Relying on RRC signaling creates a period of uncertainty until the reconfiguration is completed. In addition, RRC reconfiguration could negatively affect at least the latency performance. This is crucial when the PUCCH resources are associated with e.g. some high-priority traffic.

The transmission of UCI via re-configurable PUCCH provides a flexible and quick adaption, which is advantageous in rapid changing scenarios, such as scenarios with mobility, beam-based operation, and multi-TRP. In addition to decreasing control overhead, like additional RRC signaling, latency is also decreased. The proposed scheme provides a faster, more flexible and low-overhead change/update of some or all the parameters of at least one PUCCH configuration at a time.

In other words, many scenarios/cases benefit by a quick and flexible update of some PUCCH configuration parameters provided by adapting flexibly to fast changes of the radio situation. PUCCH functionalities like scheduling requests SR, Channel State Information, CSI, as well as other types of UCI are provided with an increased availability and quality.

According to an advantageous example, the first apparatus is further configured to: select at least one of the PUCCH configuration parameters for a future PUCCH transmission.

Advantageously, by selecting the at least one PUCCH configuration parameter, the first apparatus is able to adapt the PUCCH according to its local situation. Local parameters can have an influence on PUCCH configuration. Therefore, a distributed PUCCH allocation is provided, which increases PUCCH availability.

According to an advantageous example, the first apparatus is further configured to: transmit an indicator, which identifies the selected/suggested at least one of PUCCH configuration parameters; and receive a confirmation as a response to the transmitted indicator, the confirmation allowing the first apparatus to use the selected at least one of PUCCH configuration parameters.

The provided PUCCH allocation scheme advantageously provides that a central entity, the second apparatus, manages the PUCCH configuration requests in form of the selection indicator by providing a confirmation or not.

According to an advantageous example, the first apparatus is further configured to: receive at least one activation indicator, wherein the activation indicator is associated with at least one of the PUCCH parameters available to the first apparatus; and select and use for a future PUCCH transmission at least one of the PUCCH configuration parameters indicated by the activation indicator.

Advantageously, the selection of the PUCCH configuration parameters is done by considering the received activation indicators. Therefore, the second apparatus is capable of rapidly changing the PUCCH configuration according to the present situation.

According to an advantageous example, the first apparatus is further configured to: receive at least one further activation indicator, wherein the further activation indicator is associated with at least one of the PUCCH parameters available to the first apparatus, and wherein the further activation indicator replaces the first activation indicator; and select and use for a future PUCCH transmission at least one of the PUCCH configuration parameters indicated by the further activation indicator.

By providing a further activation indicator, the second apparatus is able to override the previously activated configuration.

According to an advantageous example, the first apparatus is further configured to: receive at least one preparation indicator associated with at least one or a plurality of PUCCH configuration parameters which are subject to an update upon receiving at least one new PUCCH configuration parameter; and receive the at least one new configuration parameter.

The preparation indicators have the advantage that previous to an actual change of the at least one new configuration parameter, the first apparatus is aware of this possible change.

According to a second aspect of the description a method to operate a first apparatus of a cellular radio communications network is provided, wherein the method comprises: receive a plurality of PUCCH, Physical Uplink Control Channel, configuration parameters; and transmit uplink control information via a PUCCH, wherein the PUCCH is configured according to at least one of the received plurality of PUCCH configuration parameters.

According to a third aspect a second apparatus is provided, the second apparatus comprising at least one processor, at least one memory including computer program code, and at least one communication module, the at least one memory and computer program code configured, with the at least one processor, and the at least one communication module, to cause the second apparatus at least to: transmit a plurality of PUCCH, Physical Uplink Control Channel, configuration parameters; and receive uplink control information via a PUCCH, wherein the PUCCH is configured according to at least one of the transmitted plurality of PUCCH configuration parameters.

According to an advantageous example, the second apparatus is further configured to: receive an indicator, which identifies at least one of PUCCH configuration parameters; and transmit a confirmation as a response to the received indicator, the confirmation allowing a use the selected at least one of PUCCH configuration parameters.

According to an advantageous example, the second apparatus is further configured to: transmit at least one activation indicator, wherein the activation indicator is associated with at least one of the PUCCH parameters available; and select and use for future PUCCH the PUCCH configuration parameters indicated by the at least one activation indicator.

According to an advantageous example, the second apparatus is further configured to: transmit at least one further activation indicator, wherein the further activation indicator is associated with at least one of the PUCCH parameters available, and wherein the further activation indicator replaces the first activation indicator; and select and use for a future PUCCH reception at least one of the PUCCH configuration parameters indicated by the further activation indicator.

According to an advantageous example, the second apparatus is further configured to: transmit at least one preparation indicator associated with at least one or a plurality of PUCCH configuration parameters which are subject to an update upon receiving at least one new PUCCH configuration parameter; and transmit the at least one new configuration parameter.

According to a fourth aspect of the description, a method to operate a second apparatus of a cellular radio communications network is provided, wherein the method comprises: transmit a plurality of PUCCH, Physical Uplink Control Channel, configuration parameters; and receive uplink control information via a PUCCH, wherein the PUCCH is configured according to at least one of the transmitted plurality of PUCCH configuration parameters.

According to a fifth aspect of the description, a communications network is provided, the network comprising the first apparatus according to the first aspect and the second apparatus according to the third aspect.

According to a sixth aspect of the description, a method to operate a radio communications system is provided, wherein the method comprises the method to operate the first apparatus according to the third aspect and the method to operate the second apparatus according to the fourth aspect.

DESCRIPTION

Figure 1:
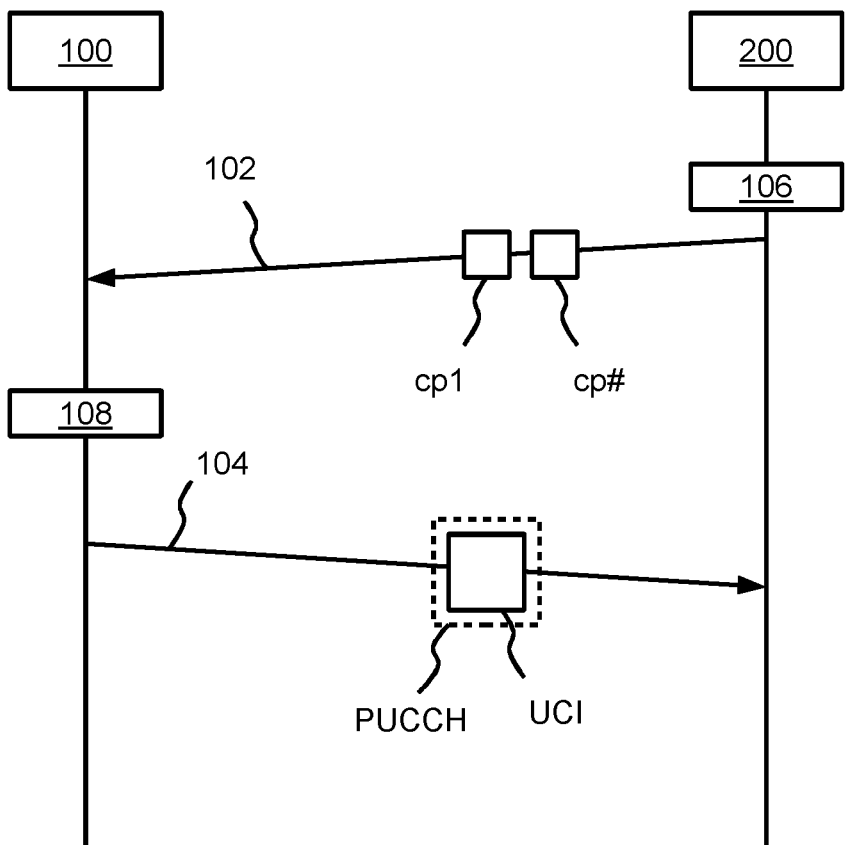
FIGS. 1 to 5 each depict a schematical sequence diagram.

FIG. 1 depicts a schematical sequence diagram. A first apparatus 100 and a second apparatus 200 participate in a radio communications network. The first apparatus 100 is configured by the second apparatus 200 to reside in a RRC, Radio Resource Control, Connected mode, in particular in a Connection Management, CM, Connected mode, for the scheme outlined in this description. For operating in the respective mode, the second apparatus 200 transmits, towards the first apparatus 100, RRC signaling, which indicates the respective operation/configuration of the first apparatus 100.

The first apparatus 100 operating in RRC Connected mode is configured with at least one Signaling Radio Bearer, SRB. The first apparatus 100 must make the transition to RRC Connected Mode to make the transition from CM-IDLE to CM-CONNECTED. The first apparatus 100 returns to CM-IDLE whenever the RRC Connection is released. The UE remains CM-CONNECTED when making the transition from RRC Connected to RRC Inactive. The first apparatus 100 will change its mode to the CM-Connected mode, when an RRC signaling connection has been established. The Access and Mobility Management Function, AMF, residing in the second apparatus 200, makes the first apparatus 100 move into CM-Connected mode when an N2 signaling connection, NGAP signaling connection, has been established.

The second apparatus 200 determines, according to a processing module or determining means 106, a plurality of PUCCH, Physical Uplink Control Channel, configuration parameters cp1, cp #. The plurality of PUCCH configuration parameters cp1, cp # are transmitted, according to a transmission 102, towards the first apparatus 100.

According to an example, the transmission 102 of the plurality of PUCCH configuration parameters cp1, cp # is done via RRC signaling. For example, after receiving an RRCSetupRequest message from the first apparatus 100, the transmission 102 comprises that the second apparatus 200 transmits an RRCSetup message, which comprises the plurality of PUCCH configuration parameters cp1, cp #, to the first apparatus 100. Then, the first apparatus 100 transmits an RRCSetupComplete message to the second apparatus 200.

For example, the plurality of PUCCH configuration parameters cp1, cp # comprise parameters in, related to, or such as: SchedulingRequestConfig information element, a SchedulingRequestResourceConfig information element, a pucch-ResourceCommon information element(such as pucch-groupHopping and a hoppingId), PUCCH-Power-Control information element, PUCCH-Config information element, PUCCH format, number of symbols, periodicity and offset, sr-ProhibitTimer, coding rate, priority, transmit-diversity (such as PUCCH repetition factor), spatial relation, time and frequency resource allocation. The pucch-Re-sourceCommon information element identifies, for example, cell-specific PUCCH resources with the following characteristics: PUCCH format, first symbol, number of symbols, PRB offset, set of initial CS indices, and PRB allocation. According to a further example, at least a part of RRC-configured PUCCH configuration parameters are provided in 3GPP TS 38.331 version 15.3.0 Release 15.

According to an example, the plurality of PUCCH configuration parameters cp1, cp #, which are transmitted from the second apparatus 200 to the first apparatus 100, are arranged in a plurality of sets, each set defining a PUCCH configuration. According to an example, the plurality of PUCCH configuration parameters determined via processing module 106 comprise at least two sets/at least two different PUCCH configurations, wherein the respective PUCCH configuration comprises at least one PUCCH configuration parameter, and in transmission 104 the PUCCH is configured according to at least one of the received plurality of PUCCH configurations.

According to another example, the plurality of PUCCH configuration parameters cp1, cp #, which are transmitted from the second apparatus 200 to the first apparatus 100, are directed to a single PUCCH configuration. For example, in transmission 104 the PUCCH is configured according to at least one of the received configuration parameters cp1, cp # or according to the received configuration parameters cp1, cp #.

According to an example, further configuration parameters are pre-configured and are not transmitted. In transmission 104, the PUCCH is configured according to at least one of the transmitted PUCCH configuration parameters cp1, cp # and according to the pre-configured further configuration parameters.

According to a processing module or determining means 108, the first apparatus 100 determines uplink control information UCI. UCI comprises at least one of HARQ feedback, Scheduling Request, SR, and periodic and semi-persistent Channel State Information, P-CSI and SP-CSI, report.

According to a transmission 104, the first apparatus 100 transmits the determined uplink control information UCI via a PUCCH towards the second apparatus 200, wherein the PUCCH is configured according to at least one of the plurality of PUCCH configuration parameters cp1, cp #, which, for example, have been received during the RRC Connected mode RRC-cm, in particular during the CM Connected mode.

According to an example, the first apparatus 100 is a radio terminal or user equipment, UE. The second apparatus is a central node of the radio communications network like a next generation NodeB, short gNB.

For instance, in case coverage has rapidly dropped, to overcome this issue, the proposed scheme can be used to quickly increase the number of PUCCH repetitions to improve coverage and thus reliability for the corresponding UL control channel. Another possibility to improve coverage, in this case, would be to at least quickly change from a short PUCCH format to a long PUCCH format, since a long format can be greater than or equal to 4-symbol long resulting in having better coverage than a short PUCCH format being limited to a length of 2 symbols. Another example is related to controlling the PUCCH reliability, particularly in case of low latency requirements, where there could be a need to quickly adapt at least the coding rate (at least for CSI and HARQ-ACK) and/or the number of PUCCH repetitions in order to guarantee the reliability (and thus latency) requirements of the corresponding PUCCH transmissions.

Figure 2:
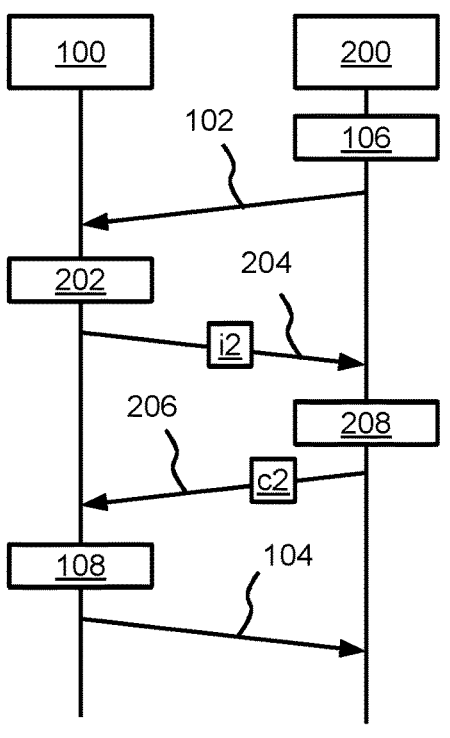

FIG. 2 depicts a schematical sequence diagram, wherein reference is made to FIG. 1 for the transmissions 102 and 104, and to processing modules 106 and 108.

According to a processing module or selecting means 202, the first apparatus 100 selects at least one of the PUCCH configuration parameters cp1, cp # for a future PUCCH transmission. According to a respective example, the plurality of PUCCH configuration parameters cp1, cp # are transmitted and received via RRC signaling.

According to a transmission 204, the first apparatus 100 transmits, towards the second apparatus 200, an indicator i2, which identifies the at least one of PUCCH configuration parameters cp1, cp #, which has been selected in processing module or selection means 202 by the first apparatus 100. According to a respective example, the indicator i2 is transmitted and received via at least one of: uplink control information using dedicated uplink resources, such as PUCCH resources, an uplink reference signal, and an uplink MAC control element.

According to a processing module or checking means 208, the second apparatus 200 checks, whether the at least one received PUCCH configuration parameter cp1, cp # fits to present operational parameters of the second apparatus 200, for example, fits to other PUCCH configuration parameters active for a further first apparatus 100. The at least one PUCCH configuration parameter cp1, cp # are suggested by the apparatus 100. Therefore, these configuration parameters can be also referred to as at least one suggested PUCCH configuration parameter.

If the test in processing module or testing means 208 is affirmative, the second apparatus 200 transmits in a transmission 206, to the first apparatus 100, a confirmation c2 as a response to the transmitted indicator i2, the confirmation c2 allowing the first apparatus 100 to use the at least one of PUCCH configuration parameters cp1, cp #. According to a respective example, the confirmation c2 is received via at least one of: the PDCCH, and a downlink MAC control element.

Therefore, a PUCCH configuration change is initiated by the first apparatus 100. The first apparatus 100 selects the PUCCH configuration that suits its situation best for a successful PUCCH transmission among the available configurations and the first apparatus 100 indicates via the indicator i2 the ID of the selected/suggested PUCCH configuration for activation to the network through UCI, transmitted on PUCCH or PUSCH, or through MAC CE.

According to an example, the indication i2 of the ID of the selected configuration could be transmitted via dedicated PUCCH resources, such as dedicated Scheduling-Request-like resources where e.g. different resources, such as time and frequency (and even spatial) related parameters, Orthogonal Cover Code (OCC), DMRS sequences, and/or cyclic shifts, are configured and used as a way to indicate the selected PUCCH configuration. Alternatively, or additionally, UL reference signals, such as SRS, Sounding Reference Signal, could be used as a way to indicate the selected PUCCH configuration, in which case e.g. some association between the UL reference signal resources/configurations and the PUCCH configurations would be needed.

According to an example, after transmission of the indication i2 towards the second apparatus 200, the first apparatus 100 directly starts using the selected PUCCH configuration without waiting for any indication/confirmation from the second apparatus 200.

According to the shown example, the first apparatus 100 does not start using the selected/suggested PUCCH configuration before the first apparatus 100 receives from the second apparatus 200 the confirmation c2 to confirm/accept the indication/suggestion transmitted via the indication i2, where this confirmation c2 could be sent through a downlink control information (DCI) or a MAC CE carried on PDSCH.

According to an example, the activation of the at least one PUCCH configuration, for example at the processing module 108 or the processing module 208, automatically leads to deactivating at least one other active PUCCH configuration or blocks/refrains from an activation of at least another non-active PUCCH configuration at the side of the first apparatus 100 and/or the second apparatus 200.

Figure 3:
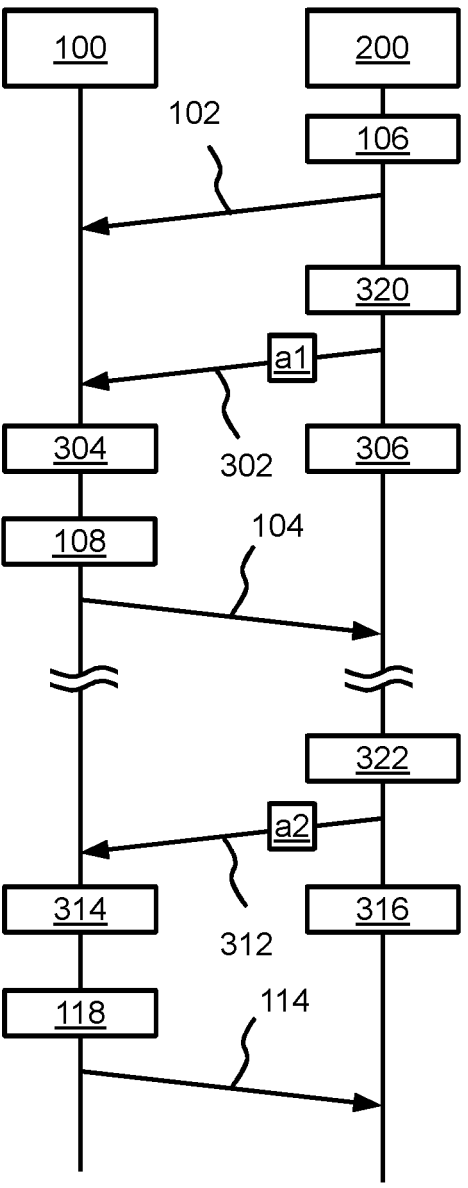

FIG. 3 depicts a schematical sequence diagram, wherein reference is made to FIG. 1 for the transmissions 102 and 104, and to processing modules 106 and 108.

According to a processing module or determining means 320, the second apparatus 200 determines at least one activation indicator a1, wherein the activation indicator a1 is associated with at least one of the PUCCH parameters cp1, cp # available to the first apparatus 100, that means allowed to use by the first apparatus 100.

According to a transmission 302, the second apparatus 200 transmits, towards the first apparatus 100, the at least one activation indicator a1. According to a respective example, the at least one activation indicator a1 is transmitted and received via at least one of: the PDCCH, and a downlink MAC control element.

According to a processing module or selecting means 304, the first apparatus 100 selects and uses, for a future PUCCH transmission, the at least one of the PUCCH configuration parameters cp1, cp # indicated by the activation indicator a1. According to an example, more than one PUCCH configurations are available and active at substantially the same time. In the former situation, according to the processing module or selecting means 304, the first apparatus 100 chooses the one configuration from the plurality of available configurations that suits its scenario or situation in order to conduct a successful PUCCH transmission. The first apparatus 100 may or may not inform the second apparatus 200 about the choice of PUCCH configuration by sending the indicator i2 of FIG. 2 before starting to use it.

According to a processing module or selecting means 306, the second apparatus 200 selects and uses, for a future PUCCH reception, the at least one of the PUCCH configuration parameters cp1, cp # indicated by the activation indicator a1. Therefore, if the UE is not configured to send the indicator i2 of FIG. 2, the second apparatus 200 considers multiple hypotheses in order to detect which PUCCH configuration is being used by the UE. In this case, considering multiple hypothesis means that the apparatus 200 may need to detect at least one of the possible PUCCH configurations from the more than one PUCCH configurations available and active at substantially the same time. The apparatus 100 may select from the more than one PUCCH configurations according to processing module 304, as the apparatus 200 is not aware of the selection of the apparatus 100.

For the example, where the apparatus informs the network about the choice of configuration in form of the indicator i2 of FIG. 2, the indication i2 is transmitted using dedicated resources, such as dedicated Scheduling-Request-like resources or the indication i2 is transmitted as part of the PUCCH transmission associated with the currently selected PUCCH configuration.

Therefore, different configurations for transmission and reception of PUCCH are available for transmitting the uplink control information UCI towards the second apparatus 200. According to the processing module or selecting means 304, the first apparatus 100 selects among the available PUCCH configurations for the transmission 104. In other words, the second apparatus 200 indicates a set of PUCCH resources, for example via the indicator a1. The first apparatus 100 shall be able to use configurations from that set.

According to a processing module or determining means 322, the second apparatus 200 determines that a radio-domain situation has changed, for example, a reduced coverage or reduced received signal strength was received, and determines at least one further activation indicator a2.

According to a transmission 312, the second apparatus 200 transmits the at least one further activation indicator a2 to the first apparatus 100, wherein the further activation indicator a2 is associated with at least one of the PUCCH parameters cp1, cp # available to the first apparatus 100, and wherein the further activation indicator a2 replaces the first activation indicator a1. According to a respective example, the at least one further activation indicator a2 is transmitted and received via at least one of: the PDCCH, and a downlink MAC control element. As a result, the configurations, from which the apparatus 100 may choose from, change. According to a processing module or selecting means 314, the first apparatus 100 selects and uses, for the future PUCCH transmission at a transmission 114, at least one of the PUCCH configuration parameters cp1, cp # indicated by the further activation indicator a2. According to a processing module or determining means 118, the first apparatus 100 determines new uplink control information UCI for the transmission 114.

According to an example, activating and deactivating of the at least one PUCCH configuration is done by the second apparatus 200 through DCI and/or MAC CE. According to an example, the activation of the at least one PUCCH configuration leads automatically to deactivating some other active PUCCH configurations. An alternative to explicitly activating/deactivating the PUCCH configuration through e.g. DCI, some implicit methods could be used by the network, such as the activation/deactivation of some PUSCH configuration(s) (e.g. Configured-Grant configuration) or some PUCCH configuration(s) (or even configuration(s) related to some reference signals) automatically leads to activating/deactivating some other PUCCH configuration(s). Alternatively, configuring/scheduling the UE with some specific channels/resources would automatically lead to activating/deactivating some PUCCH configuration(s) based on some predefined rule. Accordingly, a first mapping of a radio situation to an activation of a PUCCH configuration is provided. Accordingly, a second mapping of a radio situation to a deactivation of a PUCCH configuration is provided.

Figure 4:
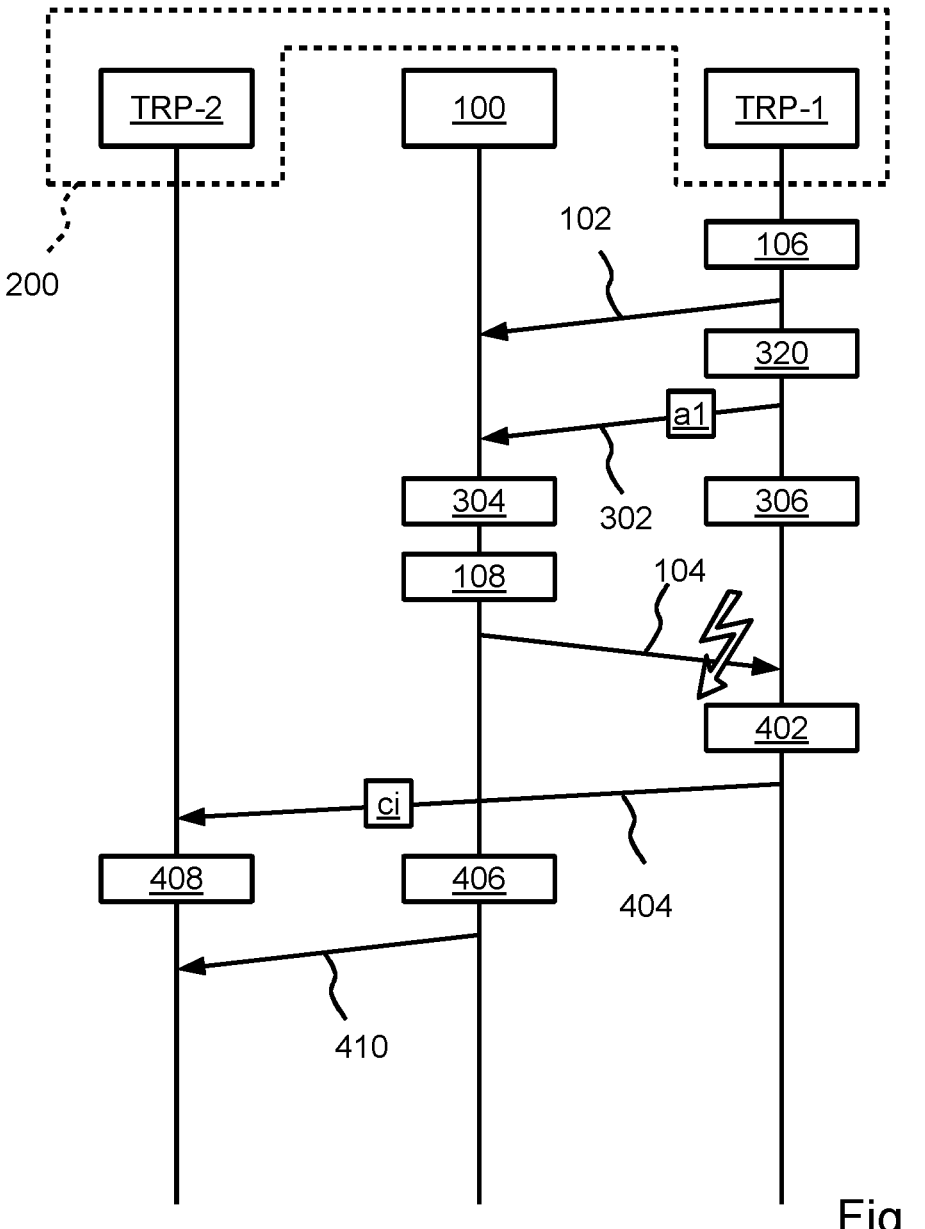

FIG. 4 depicts a schematical sequence diagram, wherein reference is made to FIG. 1 for the transmissions 102 and 104, and to processing modules 106 and 108. The second apparatus 200 comprises at least two transmission reception points TRP-1 and TRP-2.

According to a processing module or determining means 402, TRP-1 determines that TRP-1 is not able to receive some (expected) UCI, which was transmitted by the first apparatus 100 in the transmission 104. In other words, TRP-1 monitors the PUCCH configuration configured/selected by the second apparatus 200 or selected by the first apparatus 100.

According to a transmission 404, TRP-1 informs TRP2 via a coordination information ci about that TRP-1 was not able to receive or detect the expected reception of UCI in transmission 104, cf. processing module 402. According to a processing module or monitoring means 408, TRP-2 starts to monitor a second (or same) configuration of the PUCCH.

According to a processing module or changing means 406, the first apparatus 100 changes the configuration of the PUCCH to the second configuration of the PUCCH used for a next transmission of the uplink control information UCI in a transmission 410. This change of PUCCH configuration (if any) may be done autonomously by the apparatus 100 based on some predefined rule, or after the second apparatus 200 sends some signaling to the first apparatus 100.

So, at the TRP side, to reduce the detection complexity in a multi-TRP context, coordination information ci could be exchanged between the TRPs. For example, the TRP-2 does not start monitoring PUCCH transmissions corresponding to a PUCCH configuration associated with TRP-2, before the TRP-1 that has been monitoring PUCCH transmissions sends a coordination information ci to the TRP-2 so that the monitoring of PUCCH transmissions being associated with e.g. another configuration is activated at this TRP-2.

Figure 5:
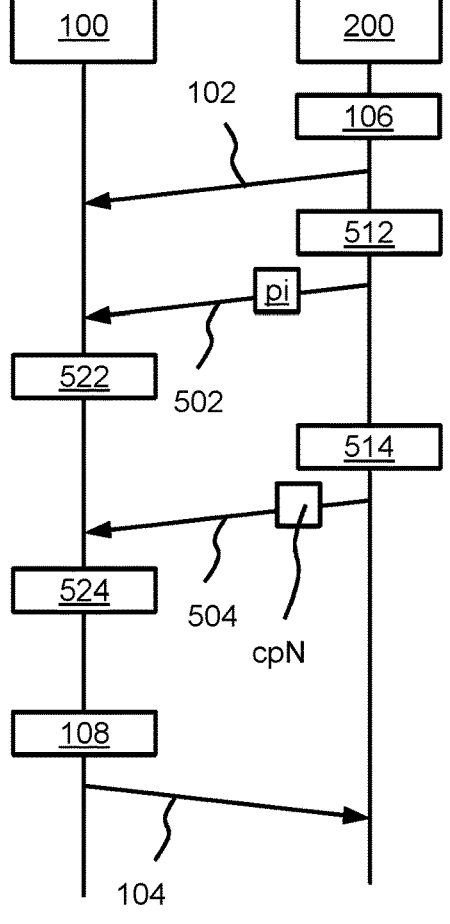

FIG. 5 depicts a schematical sequence diagram, wherein reference is made to FIG. 1 for the transmissions 102 and 104, and to processing modules 106 and 108.

According to a processing module or determining means 512, the second apparatus 200 determines at least one preparation indicator pi associated with at least one or a plurality of PUCCH configuration parameters, which are subject to an update upon transmitting at least one new PUCCH configuration parameter or a corresponding indicator.

According to a transmission 502, the at least one preparation indicator pi is transmitted to the first apparatus 100. According to a respective example, the at least one preparation indicator pi is transmitted and received via at least one of: the PDCCH, and a downlink MAC control element.

According to a processing module or listening means 522, the first apparatus 100 listens to receive the at least one at least one preparation indicator pi. For example, the preparation indicator pi indicates at least one configuration parameters that could be subject to a fast change upon request by the second apparatus.

According to a processing module or determining means 514, the second apparatus 200 determines that a quick change of the PUCCH configuration has to be conducted. Therefore, according to a transmission 504, the second apparatus 200 transmits, towards the first apparatus 100, the at least one new PUCCH configuration parameter cpN being associated with the at least one configuration parameter which subject to a potential fast change request. According to an example, the at least one new configuration parameter CpN is transmitted and received via at least one of: the PDCCH, and a downlink MAC control element.

According to a processing module or configuration means 524, the at least one new PUCCH configuration parameter cpN is applied in order to transmit the uplink control information UCI via a PUCCH defined by at least the one new configuration parameter cpN.

The PUCCH configuration is updated by explicitly indicating the new PUCCH configuration parameters by the second apparatus 200, where a set of PUCCH configuration parameters, that can be quickly changed, is configurable and this set may differ from one PUCCH configuration to another.

The second apparatus 200 triggers the change in the used PUCCH configuration by providing a trigger and the at least one new PUCCH configuration parameter cpN or the second apparatus 200 triggers to update the at least one new configuration parameter cpN, being carried through DCI and/or through a new or existing MAC CE. If DCI is used, a RNTI, Radio Network Temporary Identifier, is transmitted to the first apparatus 100, wherein the RNTI is used as an indication that the corresponding PDCCH carries updates for the at least one PUCCH configuration to be used. Multiple PUCCH configurations could be updated at a time and could have common/joint or separate update of at least one of their configured parameters. If MAC CE is used, a MAC CE could be used to carry the updates.

According to an example, the first apparatus 100 is allowed to request the change of parameters, cf. FIG. 2, via the indicator i2. Such a request could be explicitly sent as part of the uplink control information UCI or through MAC CE, or implicitly based on the transmission of specific channels or reports, in which case a pre-configured rule is defined. Once the second apparatus 200 receives this request, the second apparatus 200 updates the PUCCH configuration(s).

Figure 6:
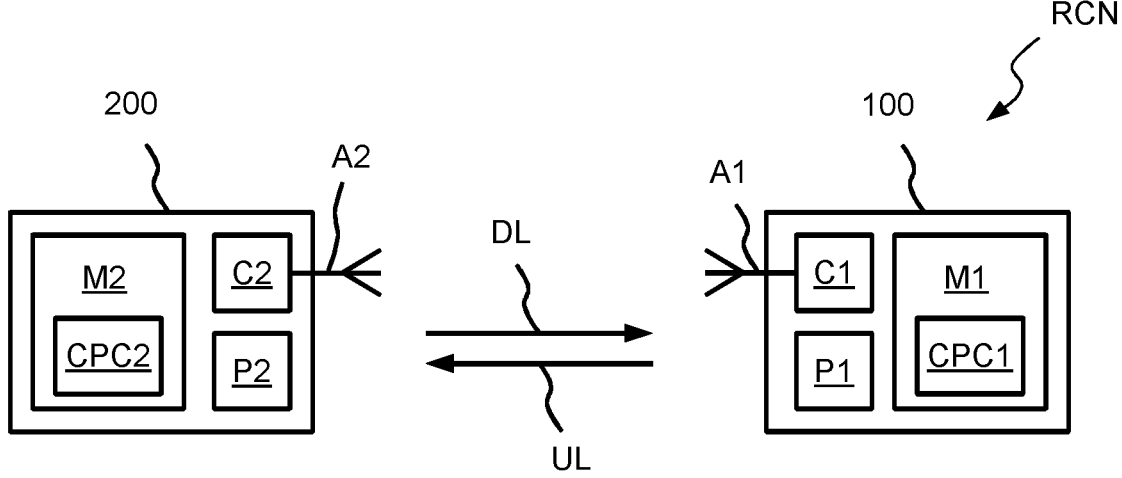
FIG. 6 schematically depicts a radio communications network.

FIG. 6 depicts schematically a radio communications network RCN. The first apparatus 100 comprises at least one processor P1, at least one memory M1 including computer program code CPC1, and at least one communication module C1 that is coupled with at least one antenna A1. The at least one memory M1 and computer program code CPC1 are configured, with the at least one processor P1, and the at least one communication module C1, to cause the first apparatus 100 at least to operate according to the present description. The second apparatus 200 comprises at least one processor P2, at least one memory M2 including computer program code CPC2, and at least one communication module C2 that is coupled with at least one antenna A2. The at least one memory M2 and computer program code CPC2 are configured, with the at least one processor P2, and the at least one communication module C2, to cause the second apparatus 200 at least to operate according to the present description. The first apparatus 100 transmits signals in a first direction UL to the second apparatus 200. The second apparatus 200 transmits signals in a second direction DL to the first apparatus 100.

According to an example the radio communications network RCN is a cellular radio communications network. The first direction UL is an uplink direction. The second direction DL is a downlink direction. The first apparatus 100 is a radio terminal. The second apparatus 200 is a base station.

In the proposed schemes, for the cases where the DCI is used for the transmission of the plurality of PUCCH configuration parameters or configurations by the apparatus 200, a group of first apparatus 100 could be addressed at a time by using dynamic signaling like for example GC-PDCCH, group common physical downlink control channel. According to an example based on the example of FIG. 2, the GC-PDCCH is used to transmit the information/confirmation to at least one first apparatus 100 about whether it can use its suggested/selected PUCCH configuration in transmission 206. According to another example of the example of FIG. 3, the GC-PDCCH is used to indicate for at least one first apparatus 100 the at least one activated or deactivated PUCCH configuration, for example in transmission 302 and/or 312. According to an example of the example of FIG. 5, the GC-PDCCH contains information e.g. on whether there is any PUCCH configuration update for at least one of the first apparatus 100, and if any, the updated parameters for each of those first apparatus 100. The indication of PUCCH configuration parameters could be done in a separate field for at least one apparatus 100, and some other parameters could be common for a group of apparatus 100 and thus the corresponding fields indicating the PUCCH configuration parameters update are common for these first apparatus 100. An RNTI indicates to the apparatus 100 that this GC-PDCCH is used to update at least some of their PUCCH configurations or PUCCH configuration parameters.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A first apparatus comprising at least one processor, at least one memory including computer program code, and at least one communication module, the at least one memory and computer program code configured, with the at least one processor, and the at least one communication module, to cause the first apparatus at least to:

receive a plurality of Physical Uplink Control Channel (PUCCH) configuration parameters, the PUCCH configuration parameters arranged in a plurality of sets, each set defining a PUCCH configuration;

select at least one PUCCH configuration parameter of the plurality of PUCCH configuration parameters for a PUCCH transmission;

transmit an indicator, which identifies the selected at least one PUCCH configuration parameter of the plurality of PUCCH configuration parameters;

receive a confirmation as a response to the transmitted indicator, the confirmation allowing the first apparatus to use the selected at least one PUCCH configuration parameter, wherein the confirmation is based on PUCCH configuration parameters that are active for a further first apparatus; and transmit uplink control information (UCI) via a PUCCH, wherein the PUCCH is configured according to the selected at least one PUCCH configuration parameter of the plurality of PUCCH configuration parameters.

2. The first apparatus according to claim 1, wherein the indicator is transmitted via at least one of: the PUCCH, an uplink reference signal, and an uplink MAC control element.

3. The first apparatus according to claim 1, wherein the plurality of Physical Uplink Control Channel (PUCCH) configuration parameters are received via at least one of: a PDCCH, Physical Downlink Control Channel, and a downlink MAC control element.

4. A method to operate a first apparatus, wherein the method comprises:

receiving a plurality of Physical Uplink Control Channel (PUCCH) configuration parameters;

selecting at least one PUCCH configuration parameter of the plurality of PUCCH configuration parameters for a future PUCCH transmission;

transmitting an indicator, which identifies the selected at least one PUCCH configuration parameter of the plurality of PUCCH configuration parameters;

receiving a confirmation as a response to the transmitted indicator, the confirmation allowing the first apparatus to use the selected at least one PUCCH configuration parameter, wherein the confirmation is based on PUCCH configuration parameters that are active for a further first apparatus; and transmitting uplink control information (UCI) via a PUCCH, wherein the PUCCH is configured according to the selected at least one PUCCH configuration parameter of the plurality of PUCCH configuration parameters.

5. The method according to claim 4, wherein the indicator is transmitted via at least one of: the PUCCH, an uplink reference signal, and an uplink MAC control element.

6. The method according to claim 4, wherein the plurality of Physical Uplink Control Channel (PUCCH) configuration parameters are received via at least one of: a Physical Downlink Control Channel (PDCCH), and a downlink MAC control element.

7. A second apparatus comprising at least one processor, at least one memory including computer program code, and at least one communication module, the at least one memory and computer program code configured, with the at least one processor, and the at least one communication module, to cause the second apparatus at least to:

transmit a plurality of Physical Uplink Control Channel (PUCCH) configuration parameters;

receive an indicator from a first apparatus, which identifies a selected at least one PUCCH configuration parameter of the plurality of PUCCH configuration parameters that was selected by the first apparatus;

determine, by the second apparatus, to confirm the selected at least one PUCCH configuration parameter based on PUCCH configuration parameters that are active for a further first apparatus;

transmit, by the second apparatus as a response to the received indicator, a confirmation allowing the first apparatus to use the selected at least one PUCCH configuration parameter; and receive uplink control information (UCI) via a PUCCH configured according to the selected at least one PUCCH configuration parameter.

8. The second apparatus according to claim 7, wherein the indicator is received via at least one of: the PUCCH, an uplink reference signal, and an uplink MAC control element.

* * * * *